(12) United States Patent
Hales et al.

(10) Patent No.: US 10,518,202 B2
(45) Date of Patent: Dec. 31, 2019

(54) FILTER SYSTEM

(71) Applicant: Bullfrog International, L.C., Bluffdale, UT (US)

(72) Inventors: Eric Hales, Eagle Mountain, UT (US); Mark W. McLane, Lehi, UT (US)

(73) Assignee: BULLFROG INTERNATIONAL, L.C., Bluffdale, UT (US)

( * ) Notice: Subject to any disclaimer, the term of this patent is extended or adjusted under 35 U.S.C. 154(b) by 303 days.

(21) Appl. No.: 15/361,892

(22) Filed: Nov. 28, 2016

(65) Prior Publication Data

US 2018/0147510 A1    May 31, 2018

(51) Int. Cl.
*B01D 35/30* (2006.01)
*B01D 29/15* (2006.01)
(Continued)

(52) U.S. Cl.
CPC .......... *B01D 35/306* (2013.01); *B01D 29/15* (2013.01); *B01D 29/21* (2013.01); *B01D 35/143* (2013.01); *B01D 37/025* (2013.01); *C02F 1/001* (2013.01); *C02F 1/68* (2013.01); *E04H 4/12* (2013.01); *E04H 4/1209* (2013.01); *B01D 2201/0407* (2013.01); *B01D 2201/0415* (2013.01); *B01D 2201/301* (2013.01);
(Continued)

(58) Field of Classification Search
CPC .... B01D 35/306; B01D 29/21; B01D 37/025; B01D 2201/4046; B01D 2201/0407; B01D 2201/301; B01D 2201/4092; B01D 35/143; B01D 29/15; B01D 2201/0415; B01D 2201/4076; B01D 2201/4053; C02F 1/001; C02F 1/68; C02F 2201/006; C02F 2103/42; E04H 4/12; Y10T 29/49604

See application file for complete search history.

(56) References Cited

U.S. PATENT DOCUMENTS 3,467,256 A * 9/1969 Humbert, Jr. .......... B01D 27/06
                                                      210/132
4,683,057 A * 7/1987 Krause ............... B01D 17/0202
                                                      210/232

(Continued)

OTHER PUBLICATIONS

International Search Report and Written Opinion from PCT International Application No. PCT/US2016/068325, dated Apr. 28, 2017, 9 pages.

*Primary Examiner* — Sarang Afzali
(74) *Attorney, Agent, or Firm* — Durham Jones & Pinegar, P.C.

(57) ABSTRACT

A system for filtering water in a spa that provides safety and greater filtration. The system may include a filter secured to a core. The core may include first and second cages with a plurality of openings allowing water to freely pass through the filter and core while preventing larger objects from passing through. The first cage may provide an orientation feature to position the filter in one direction. The second cage may hold mineral cartridges. The core may be secured to a fitting that is secured to the suction line of a spa via a ratchet-like engagement feature. The fitting and core prevent back out of the core unless manually overriding the arm on the core which engages fins on the fitting. The filter may be removed and replaced while the core remains in place providing safety to the user. A cap secures the whole assembly into place.

8 Claims, 13 Drawing Sheets

(51) Int. Cl.
    *B01D 35/143*     (2006.01)
    *C02F 1/00*     (2006.01)
    *C02F 1/68*     (2006.01)
    *E04H 4/12*     (2006.01)
    *B01D 37/02*     (2006.01)
    *B01D 29/21*     (2006.01)
    *C02F 103/42*     (2006.01)

(52) U.S. Cl.
    CPC ............... *B01D 2201/4046* (2013.01); *B01D 2201/4053* (2013.01); *B01D 2201/4076* (2013.01); *B01D 2201/4092* (2013.01); *C02F 2103/42* (2013.01); *C02F 2201/006* (2013.01); *Y10T 29/49604* (2015.01)

(56) References Cited

U.S. PATENT DOCUMENTS

| | | |
|---|---|---|
| 5,190,651 A | 3/1993 | Spencer et al. |
| 5,250,179 A | 10/1993 | Spearman |
| 5,409,606 A | 4/1995 | Spencer |
| 6,110,368 A * | 8/2000 | Hopkins ............... B01D 29/111 |
| | | 210/497.1 |
| 6,739,459 B1 | 5/2004 | Hartmann |
| 7,318,800 B2 * | 1/2008 | Stoyell ................. B01D 29/111 |
| | | 493/430 |
| 7,887,704 B2 * | 2/2011 | Jiang ..................... B01D 27/06 |
| | | 210/338 |
| 8,034,240 B2 * | 10/2011 | Reiland ................. B01D 27/08 |
| | | 210/299 |
| 2004/0221381 A1 | 11/2004 | Mattson, Jr. et al. |

* cited by examiner

FILTER SYSTEM

TECHNICAL FIELD

This disclosure relates generally to filters for pools and spas that filter the water to assist in keeping a spa or pool clean from contaminants and, more specifically, filter design features for orientation, efficiency, safety and ease of replacement and cleaning. The features disclosed herein are numerous in nature and may be utilized in a number of different ways to provide the same or similar filtration results.

RELATED ART

Filters are used in nearly all pools and spas around the globe. The spa industry has designed a number of filters to assist in keeping spas clean from contaminants. Spa filters are perhaps one of the most expensive parts that you have to replace on a regular basis in order to maintain a spa.

Many spas use a filter design that requires a customer to shut down a spa pump system first before removing the filter from the spa. This is required because when the filters are removed the primary suction lines used by the spa are exposed. An unprotected suction line is potentially dangerous and may harm a customer or any other person that is close to unprotected suction lines that now have the filter removed. Hair, limbs, or clothing could potentially be pulled into the opening risking the life or causing injury of that person.

Filtration designs typically include one or more filters situated in a cavity of some shape that allows water to flow in through a grate or weir. These designs have a tendency to create a water flow pattern through the filter that is not symmetrical. Many times water will dominantly flow through one side of the filter and not the other, this leads to the filter media not being as effective as it should be and one side eventually filling up with contaminants.

Standard spa filters often include a base cap and a top cap with the filter media, or filter material, between the base cap and top cap. Additionally, the filter media is often permanently affixed to the base and top caps. The filters are often screwed into place at the base cap wherein the base cap includes a protruding cylinder extending from the base cap with a central hole that allows the water to pass through and into the suction line after the water has passed through the filter material. The cylinder of the base cap is screwed into the spa itself, usually into the suction line with complementary threads on the cylinder and in the suction line. The top caps often include a handle-like protrusion that allows a user to hold on to the standard filter and orient it onto the suction line in the appropriate place of the spa. The handle also may allow a user to easily twist the filter into place.

While these filters may provide filtration they lack any safety features as well as the ease of replacement so often desired. The filter system disclosed herein takes into account the easiness of replacing a filter, or washing and reusing a current filter, while at the same time providing safety to the users of the spa.

SUMMARY

This disclosure, in at least one aspect, relates to the use of a filtration system for a spa or pool that utilizes a filter to aid in removing water contaminants. More generally the filter system utilizes a core that engages the suction line of the spa and allows water to pass therethrough. A user may easily replace a filter on the filter system with little risk to harm or injury because of the core of the filter system.

The filter system may include a core that engages the suction line of the spa. A first portion, or proximal portion, of the core may engage the filter as well with the filter at least partially surrounding the core. The filter may be easily removed from the core in a vertical orientation. The filter may include a stabilizing ring or rods on the inside or outside, or both, of the filter material, for increased stabilization when the filter is not engaged with the core. The filter may include a base plate or cap and a top plate or cap. Both the base cap and top cap may include apertures that may allow the core to pass easily therethrough. The base cap and top cap may increase stability of the filter material and only extend the diameter of the filter material.

The filter system may include a locking mechanism that prevents removal of the central portion, or primary cage, of the core without release of the locking mechanism. A secondary cage may reside within the primary cage and may hold mineral or other cartridges as desired by the user. The core may further include a second locking mechanism, or distal portion, or cap that engages a distal end of the core. The cap may threadably fit on the distal end of the core maintaining the filter in place on the core and preventing vertical movement of the filter on the core.

A new filter is disclosed herein that when installed is oriented the same direction every time. This orientation factor allows a density change of the filtration media based on the flow of water into the filter area. A more efficient flow may be accomplished by placing a denser filter media into the direct path of the flow to help push some of that flow towards the back of the filter where the media is less dense. The ability to change the density, design or even the type of filter media based on the location and flow of water is a ground breaking concept in the industry.

This is accomplished by at least some of the following components: one is a filter core which is threaded onto a safety bulkhead fitting. Because of the type of threads and how the two parts come together and lock, as set forth herein, the filter and core of the filter are oriented the same way every time in relation to the a safety bulkhead fitting. The filter and core may include a rib or some similar feature that corresponds to the filter itself such that the filter can only be placed in one particular orientation.

There is a plurality of means and methods for fixing and securing the core to the spa or for fixing the filter to the core and multiple variations are disclosed herein. Other aspects, as well as features and advantages of various aspects of the disclosed subject matter will become apparent to one of ordinary skill in the art form the ensuing description, the accompanying drawings and the appended claims.

DETAILED DESCRIPTION

FIGS. 1-4 illustrate an embodiment of a filter system 10 for utilization in a spa or pool. The filter system 10 may comprise a filter 12 positioned around a core 14 and a cap 16 toward a distal end 18 of the core 14. The filter 10 may be cylindrically shaped with a channel 20 passing through the body of the cylinder. The channel 20 may be centrally positioned within the filter 12 and may allow for the core 14 to slidably engage the filter 12 via the channel 20. The core 14 may further include a proximal portion 22 and a first cage 24 positioned between the distal end 18 and the proximal portion 22.

The filter system 10 may include a safety bulkhead fitting configured to engage a spa, specifically within, or at the end of, the suction line. The safety bulkhead fitting, or fitting 26, engages the core 14 opposite the suction line facing side. The fitting 26, may be placed into the spa suction line prior to engaging the core 14 or the fitting 26 may be attached to the suction line with the core 14 previously fixed to the fitting 26. The filter 12 may be slidably fit to the core 14 prior to the core 14 being secured to the fitting 26; however, the filter 12 may also be secured after the core 14 is secured to the fitting 26.

The filter system 10 may be considered hollow, or rather the system may allow for water to freely pass through the filter system 10 as the filter system 10 is secured to the spa. Water may flow freely through the filter 12, removing contaminants. The water, after passing through the filter 12 then enters the channel 20 of the filter 12. Water may then flow freely from the channel into the core 14 and passes through the center of the core 14 through the fitting 26 and into the suction line of the spa.

Figure 1:
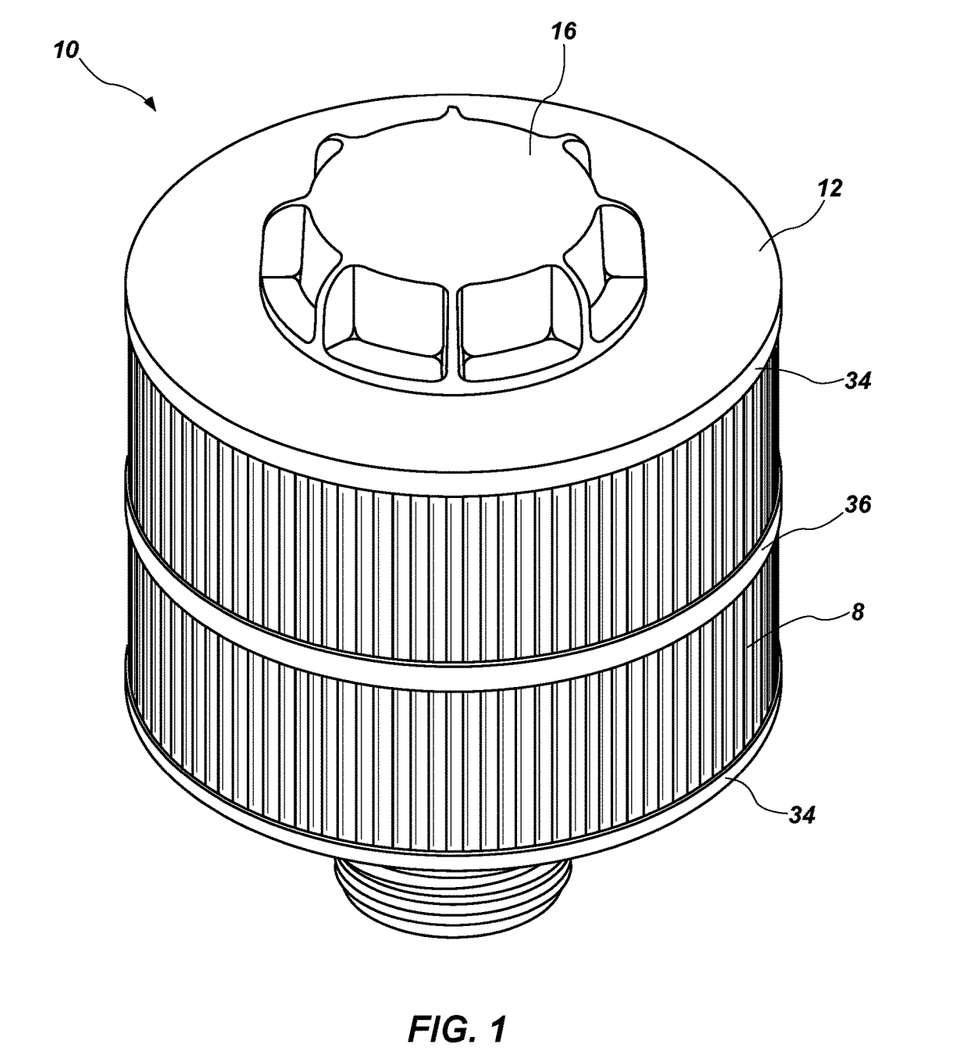
FIG. 1 is a top perspective view of a filter system with a filter, a core, a fitting and a cap.
Figure 2:
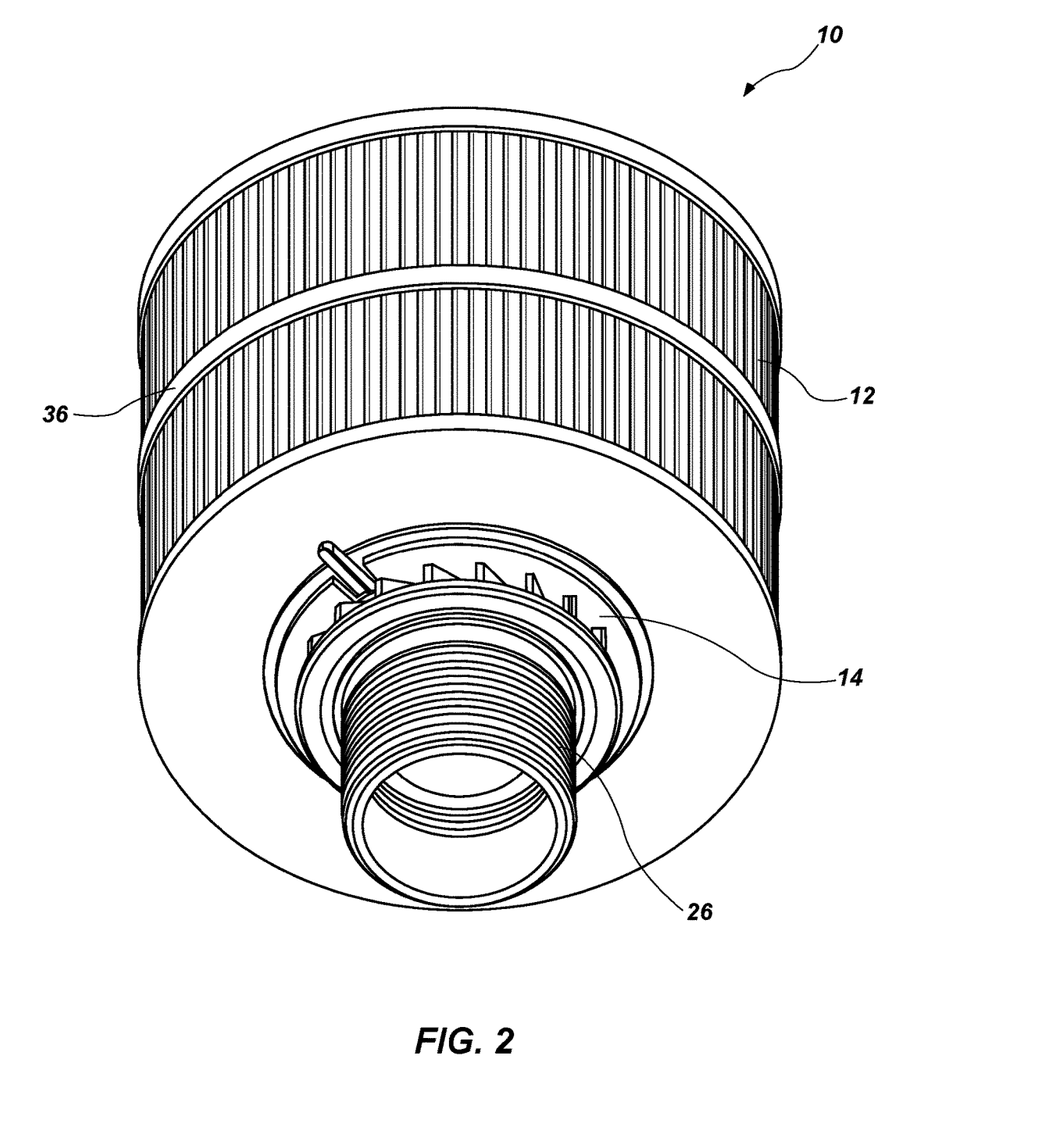
FIG. 2 is a bottom perspective view of a filter system of FIG. 1 with the core, the fitting and the filter.
Figure 3:
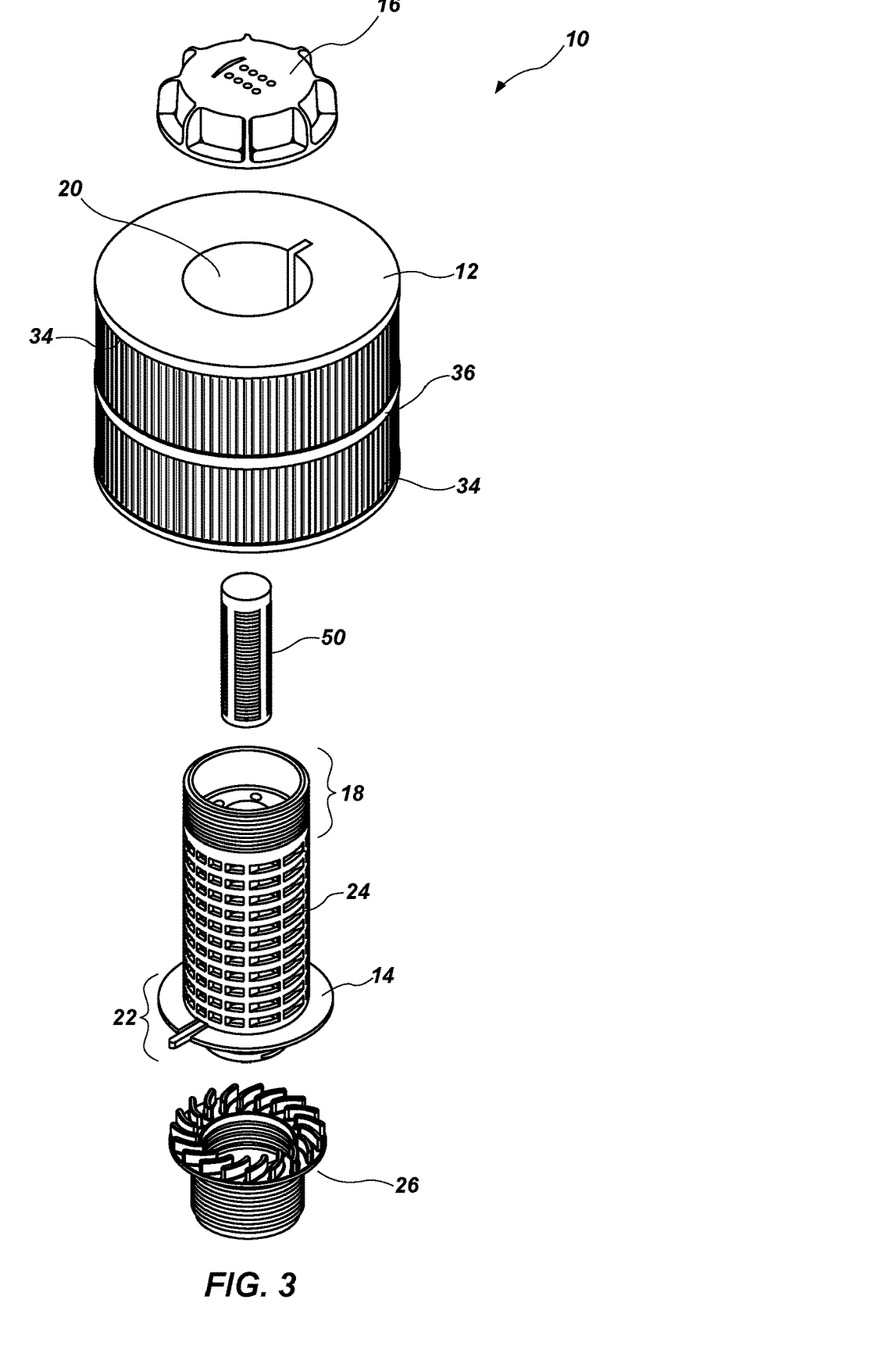
FIG. 3 is an exploded perspective view of the filter of FIG. 1 with the core, with a proximal portion, a distal portion and a first and second cage, a mineral cartridge, the filter, the fitting and the cap.
Figure 4:
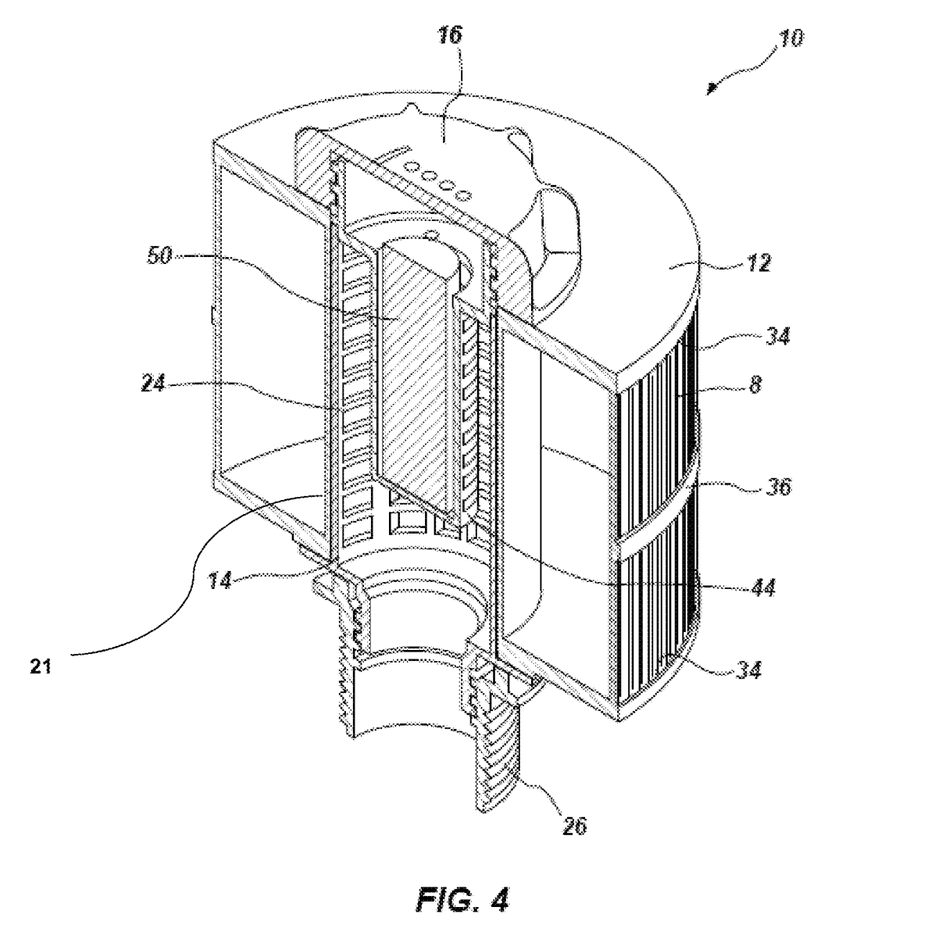
FIG. 4; is a cross-sectional perspective view of the filter system of FIG. 1
Figure 5:
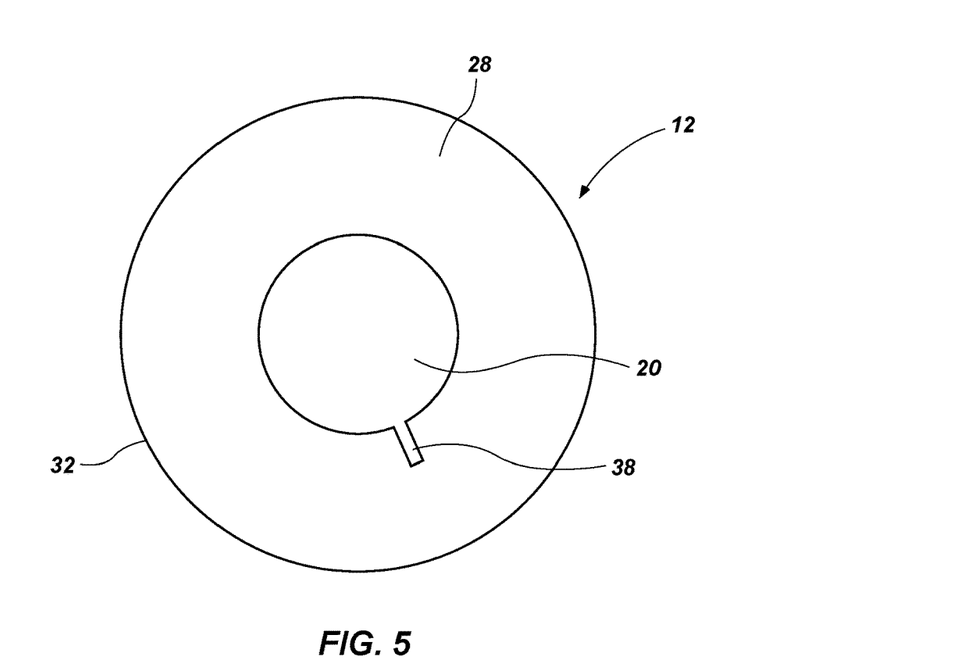
FIG. 5, ia a top view of the filter of FIG. 1.
Figure 6:
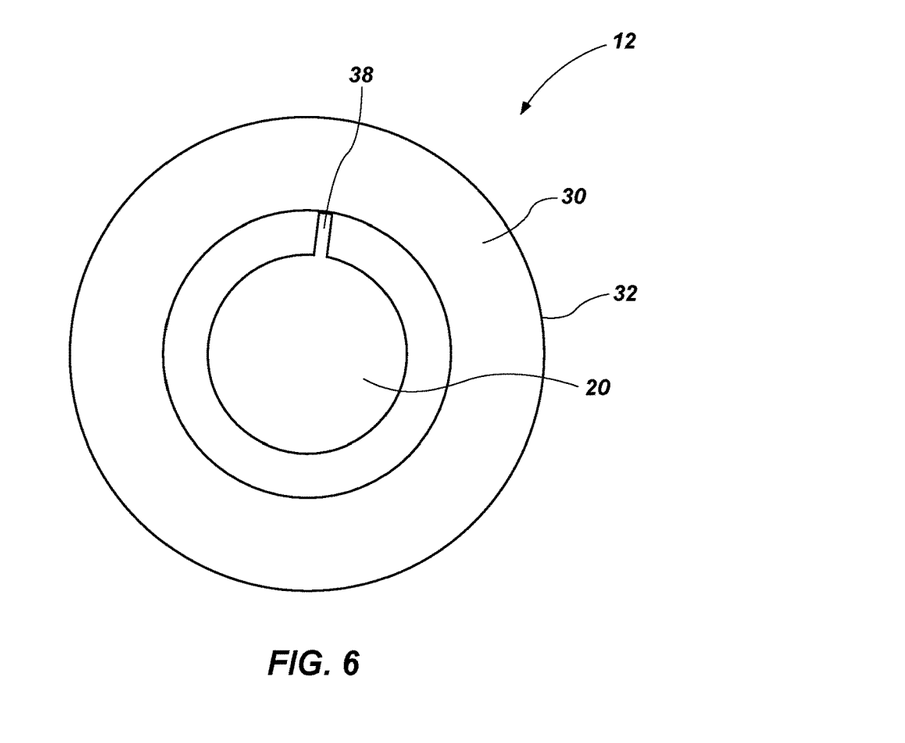
FIG. 6 is a bottom view of the filter of FIG. 1.
Figure 7:
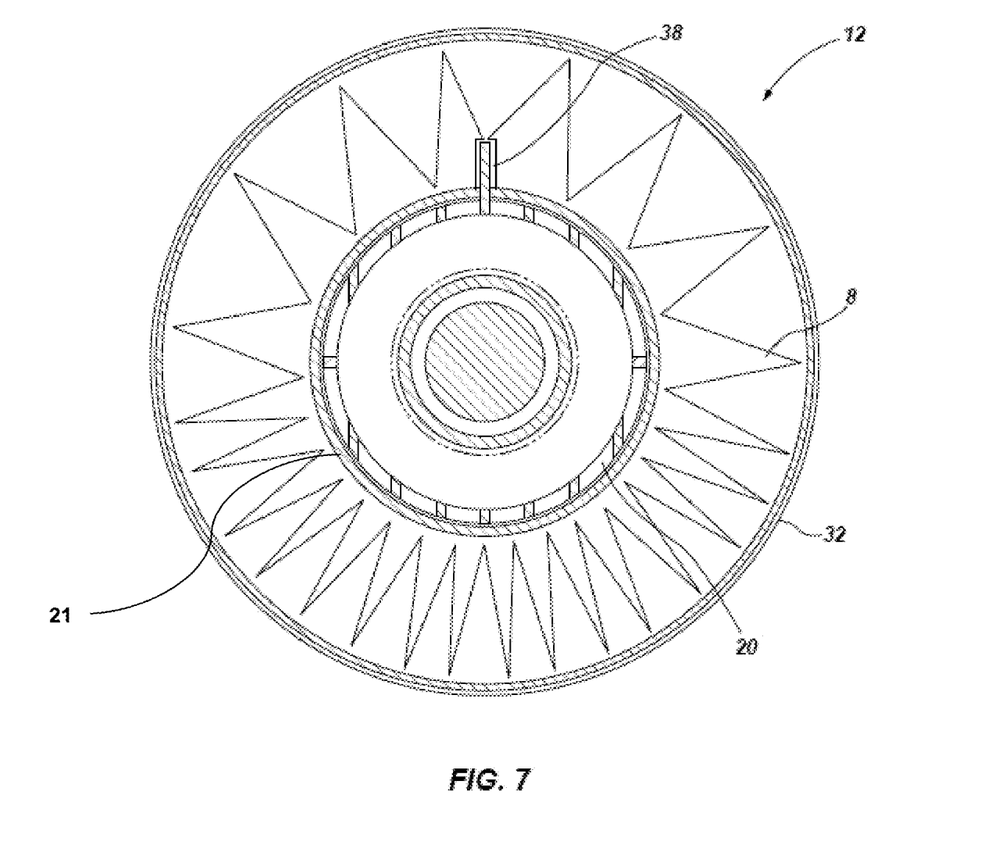
FIG. 7 is a top cross-sectional view of the filter of FIG. 1.

Referring to FIGS. 5-7, the filter 12 is shown with the channel 20 passing through the center. The filter 12 may include a rigid cylindrical filter core within the channel 20 comprised of polymer or other rigid material to help the filter 12 maintain its shape from a vertical perspective. Alternatively, the channel 20 may include other structural elements such as rods or other minimal support. The structural elements, whether the rods or filter core or other support element(s) may prevent the filter 12 from any type of collapse or sag. On the other hand, however, no structural elements may be used outside of the filter media or material itself, thus allowing collapse or deformation of the filter 12 if the load on the pump of the spa is too great thus allowing a self-regulated bypass of water past the filter (because it has been deformed or collapsed). The collapse of the filter 12 may occur but ideally no more than one (1) inch of collapse will be allowed. The collapse of the filter may occur by the filter 12 twisting its shape. Total collapse may be prevented because of the interaction between a rib 66 (further described herein) and at least one cutout 38 (further described herein). The collapse may be intentional and may include a sensor which recognizes the collapse of the filter and in turn sending a signal to the spa owner (via a light, a message to user/owner of the spa via text or email) notifying the user of the need to change the filter 12. Alternatively, a visual indicator may also be used, at the top of the filter 12, wherein if a gap is observed toward the top of the filter 12 marks may be shown to indicate replacement of the filter 12 is needed. Different methods of visual indication may include color such, such as green, yellow and red rings becoming exposed. Likewise other visual rings with easy to read words, such as "order replacement" and "replace now" and other variations on that theme, easily read by a user and which notify of need for filter replacement.

The filter 12 may include a top filter plate 28 and a bottom filter plate 30. The filter plates 28, 30 may provide stability of the filter system 10 as a whole. The filter plates 28, 30 may also add rigidity to the filter 12 and may fix the filter material 8 in a more rigid position. The filter plates 28, 30 may extend circumferentially from the channel 20 to a perimeter 32 of the filter 12. The filter plates 28, 30 may further include shoulders or lips 34 that extend, at least partially, toward the opposite filter plate. A ring 36, which may be flexible, may also extend around a central portion of the filter 12 adjacent and in contact with the filter material 8. The ring 36 may maintain the filter material 8 in a desired position as well as provide stability and rigidity to the filter 12 itself. The ring 36 may be comprised of the same material as the filter media or it may be any other flexible material that aids in maintaining shape and rigidity of the filter 12, which may include nylon, plastics, fabrics or metals. A structural member 21 may extend from the top filter plate 28 and the bottom filter plate 30 and extend within the channel 20 to maintain rigidity of the filter 12.

The filter 12 may also include at least one cutout 38, or void in both the top filter plate 28 and the bottom filter plate 30. The at least one cutout 38 may be aligned in both the top filter plate 28 and the bottom filter plate 30. The cutout 38 may extend through both filter plates 28, 30 and the at least one cutout 38 may be aligned through the entire cylindrical longitudinal body.

A standard filter may comprise standard filter media, or filter material which may comprise the same density of filter material circumferentially around the cylindrical filter. Referring to FIG. 7, the filter material 8 comprises multiple or a plurality of peaks and valleys as is standard for a spa filter. However, the filter material 8 may be denser with one portion of the filter material 8 over the other material, for example, the filter material 8 on one half of the cylinder may be denser than on the other half of the cylinder of the filter 12. The at least one cutout 38 of the filter 12 allows for a single orientation of the filter 12 such that the denser side of the filter 12 may face the center of a spa and the less dense side of the filter material 8 of the filter 12 may face the wall of the spa. Thus a more efficient flow may be accomplished by placing the denser portion of the filter media 8 into the direct path of the flow to help push some of that flow towards the back of the filter 12 where the media is less dense.

The filter material 8 is easily manipulatable to allow an element to pass through the at least one cut out 38 with the element also running through a valley of the filter material 8. The at least one cut out 38 may be configured to receive a portion of the core 14 for proper orientation of the filter 12 with the core 14, such that the filter 12 may be oriented the same direction each time the filter 12 is installed, or reinstalled.

The top and bottom filter plates 28, 30 may be made from any plastic or polymer material that is not too heavy but provides stability and rigidity. Other materials are contemplated such as all polymers, plastics, rubbers, nylons and even certain metals.

Figure 8:
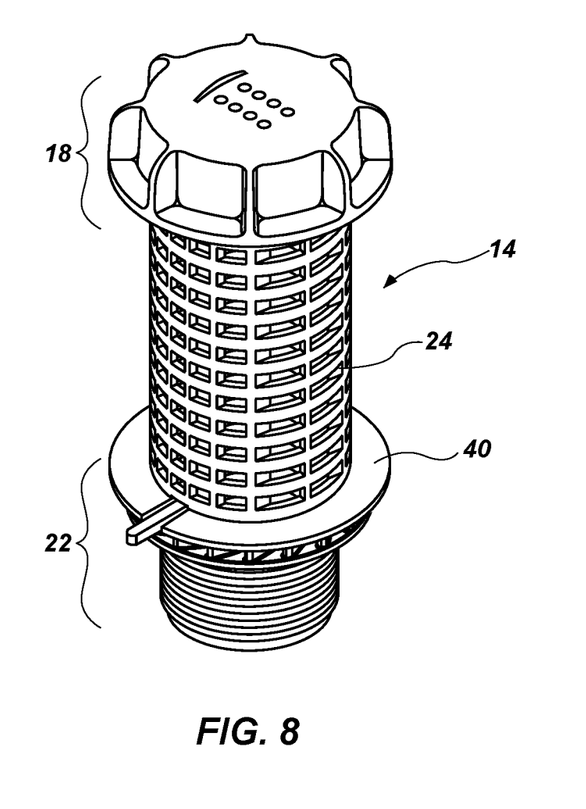
FIG. 8 is a top perspective view of the core of FIG. 4 with the cap, the first cage, the proximal portion, the distal portion and the fitting.
Figure 9:
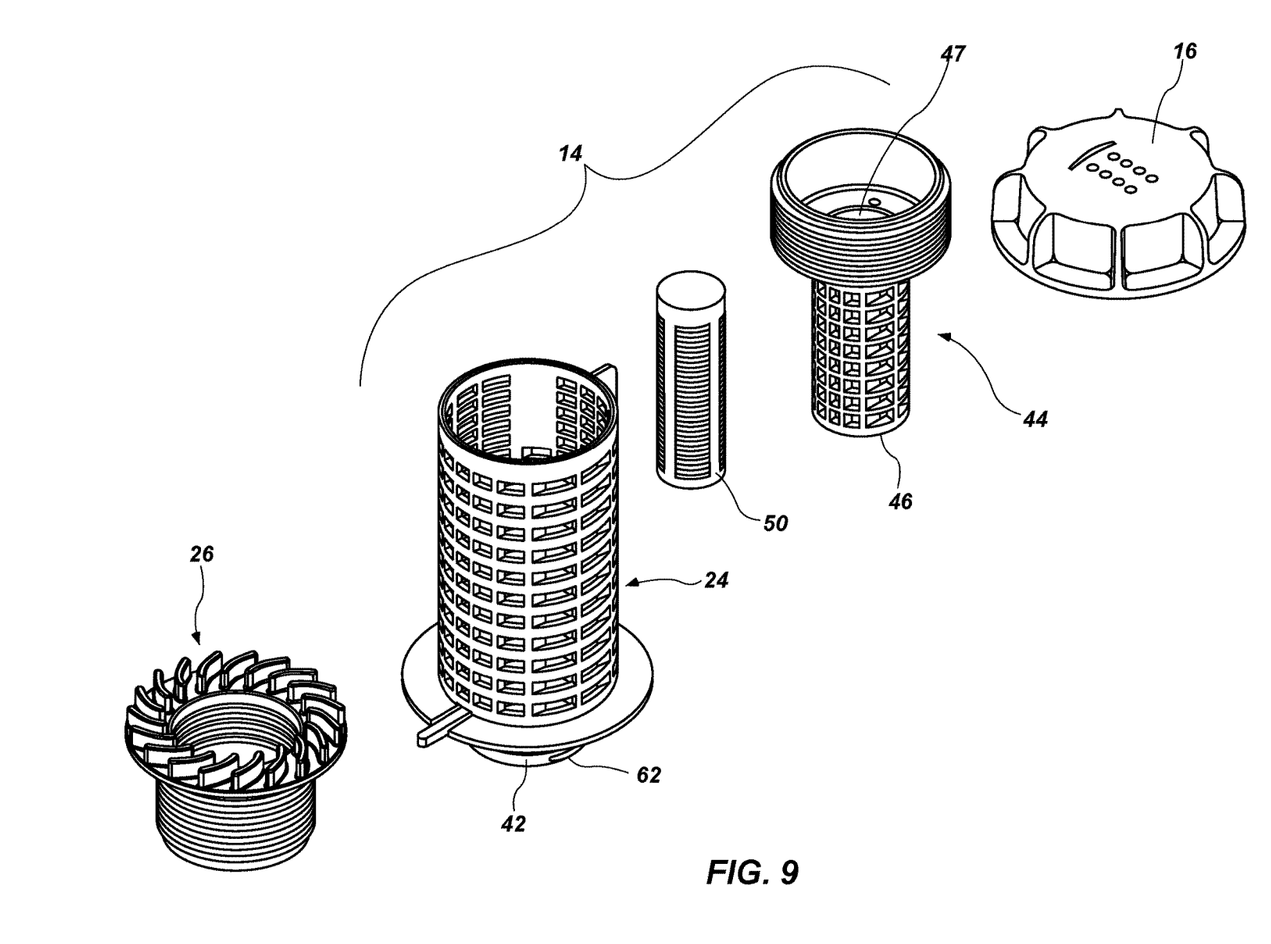
FIG. 9 is an exploded view of the core of FIG. 8 with the cap, the first cage, a second cage, a mineral cartridge and the fitting.

FIGS. 8 and 9 illustrate the core 14 with the first cage 24 with the proximal portion 22 and the distal end 18. The proximal portion 18 may include a shoulder 40 extending circumferentially away from a center of the core 14 and toward the base of the first cage 24. The shoulder 40 may be configured to receive the filter 12 and allow it to rest on the shoulder 40. Extending proximal the shoulder 40 is a core threaded portion 42 that may include threads configured to engage the fitting 26. The cap 16 may engage the core 14 at the distal end 18 and may be threaded to the core 14. The core 14 may further include a second cage 44 which may be positioned within the first cage 24. The second cage 44 may be welded to the first cage 24 creating a single element which is permanently fixed. Alternatively, the second cage 44 may be a separate element configured to engage the first cage 24 through a threaded fit, snap fit, press fit or other fit which may be reversibly attached.

The second cage 44 may reside adjacent to the distal end 18 or engage the distal end 18. The second cage 44 may extend proximally within the first cage 24 and terminate at a second cage proximal end 46 at least partially within the first cage 24. The second cage 44 may comprise an opening 47 at the second cage distal end 48 to allow for easy addition or removal or a mineral (or similar) cartridge 50. Access to the second cage opening 47 may be achieved by removing the cap 16. The cartridge 50 may be slidably inserted into the second cage opening 47. The cartridge 50 is held into place by the second cage 44 and the cap 16. However, it is contemplated that the cartridge 50 may be force fit into the second cage 44 or the second cage 44 may include a snapping lip that holds the cartridge 50 in the second cage 44 and only when the second lip is manipulated may the cartridge 50 be removed. It will be appreciated that any number of ways to secure the cartridge 50 in the filter system 10, and specifically within the second cage 44 are contemplated and included within the scope of this embodiment.

As the water is pulled through the filter 12 it is exposed to the mineral cartridge 50. By having the second cage 44 positioned in the upper middle of the core 14, and thus the cartridge 50 suspended, it allows water to flow in and around the cartridge 50 without restricting the overall flow and performance of the spa. This also allows easy access to the cartridge 50 by removing the cap 16 and prevents anything from falling down into the suction line or filter line of the spa. The second cage 44 may also allow other styles of cartridges to be used beyond a mineral cartridge 50; this could include but would not be limited to aroma therapy cartridges, chlorine tablets and bromine tablets.

The first cage 24 and second cage 44 may comprise a lattice like structure or cage-like structure that allows the free flow of water there through and there between. The first cage 24 and second cage 44 designs comprise multiple openings and are shaped such that no object could physically block enough of the openings at one time to create enough suction to hold it down. The distal end 18 may also engage the system cap 16 which may secure the filter 12 to the core 14 preventing, at least substantial, vertical movement of the filter 12 on the core 14. The system cap 16 may maintain the filter system 10 engaged with the spa with the aid of other elements of the filter system 10, such as the fitting 26.

Figure 10:
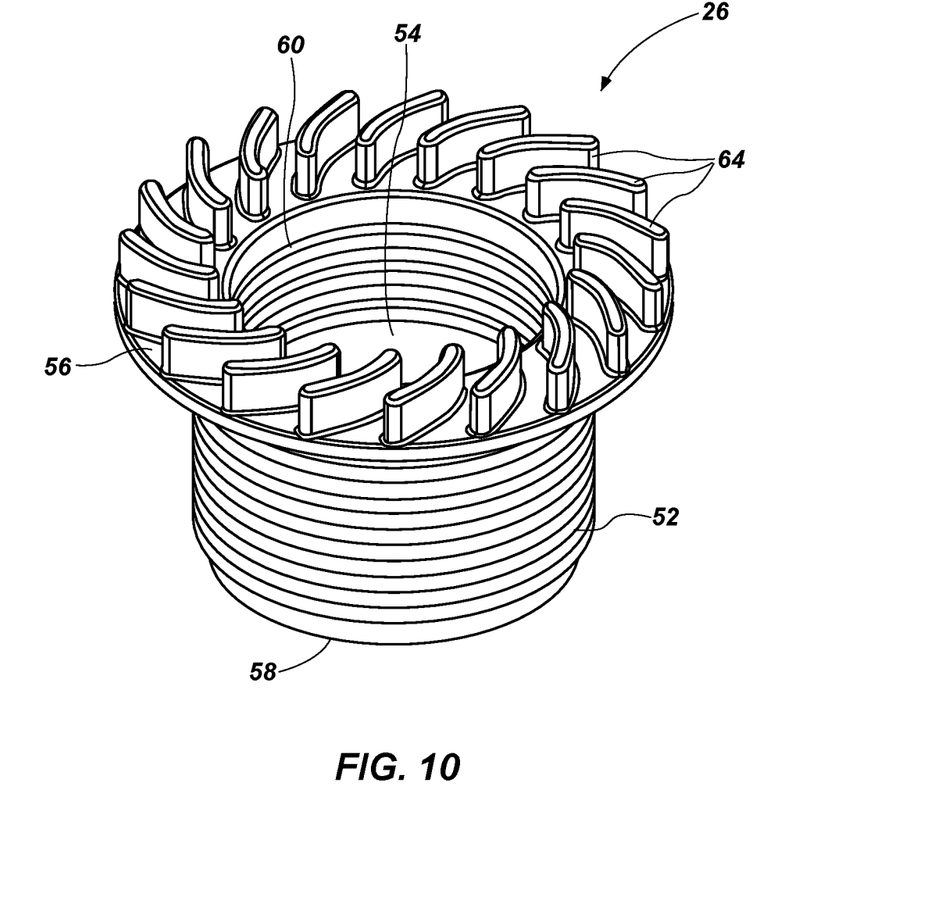
FIG. 10 is a perspective view of the fitting of FIG. 8.
Figure 11:
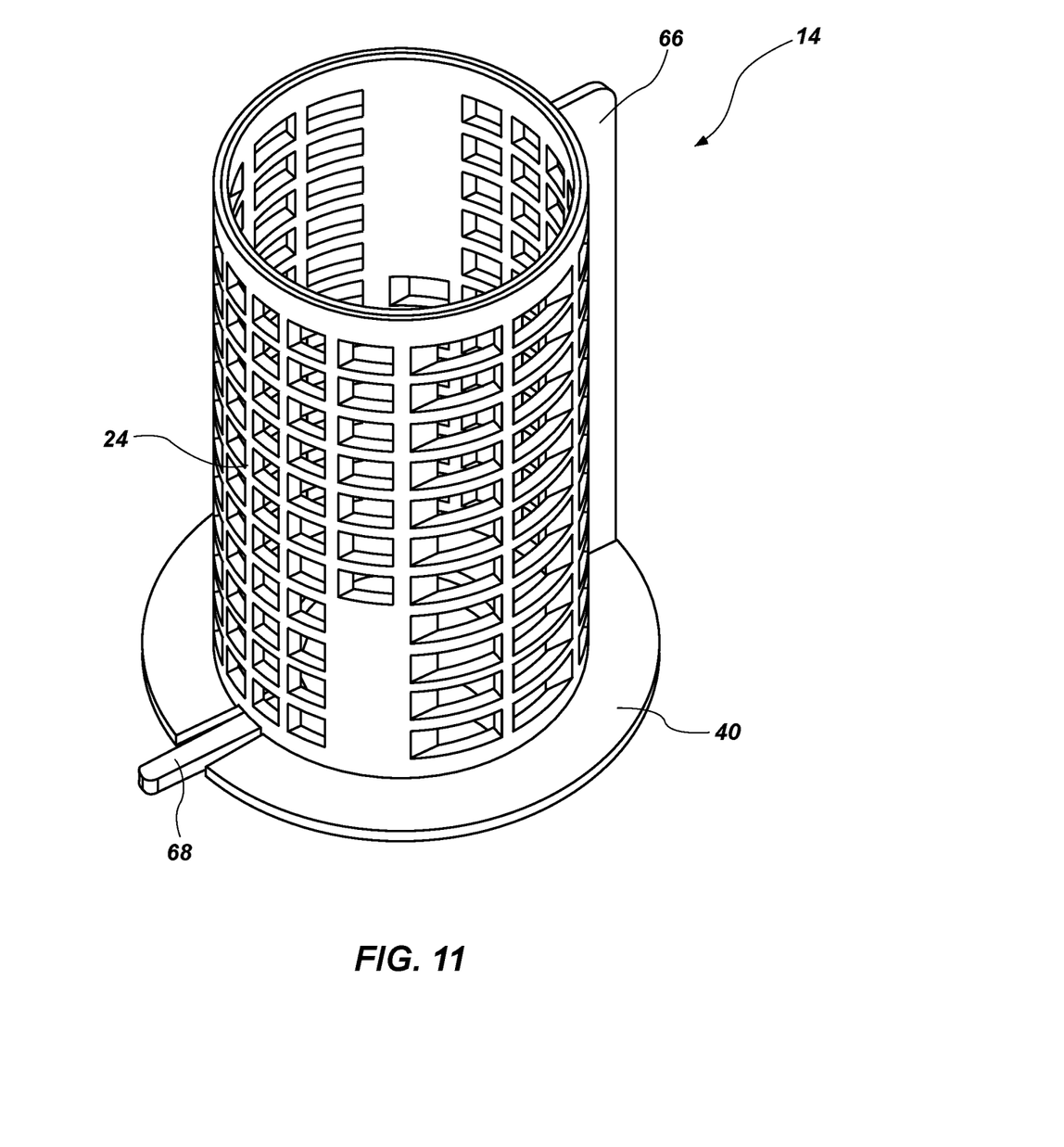
FIG. 11 is a top perspective view of the core of FIG. 8.

Referring to FIG. 10, the proximal portion 22 of the core may engage the fitting 26 that may be mounted into the spa itself or the suction line of the spa itself. The fitting 26 may include exterior threads 52 that allow the fitting 26 to be secured to the spa. The exterior threads 52 may be complementary with and consistent with threads that currently reside within current spas allowing a retrofit; however, the fitting 26 may also be used in all new manufacture spas as well.

Figure 12:
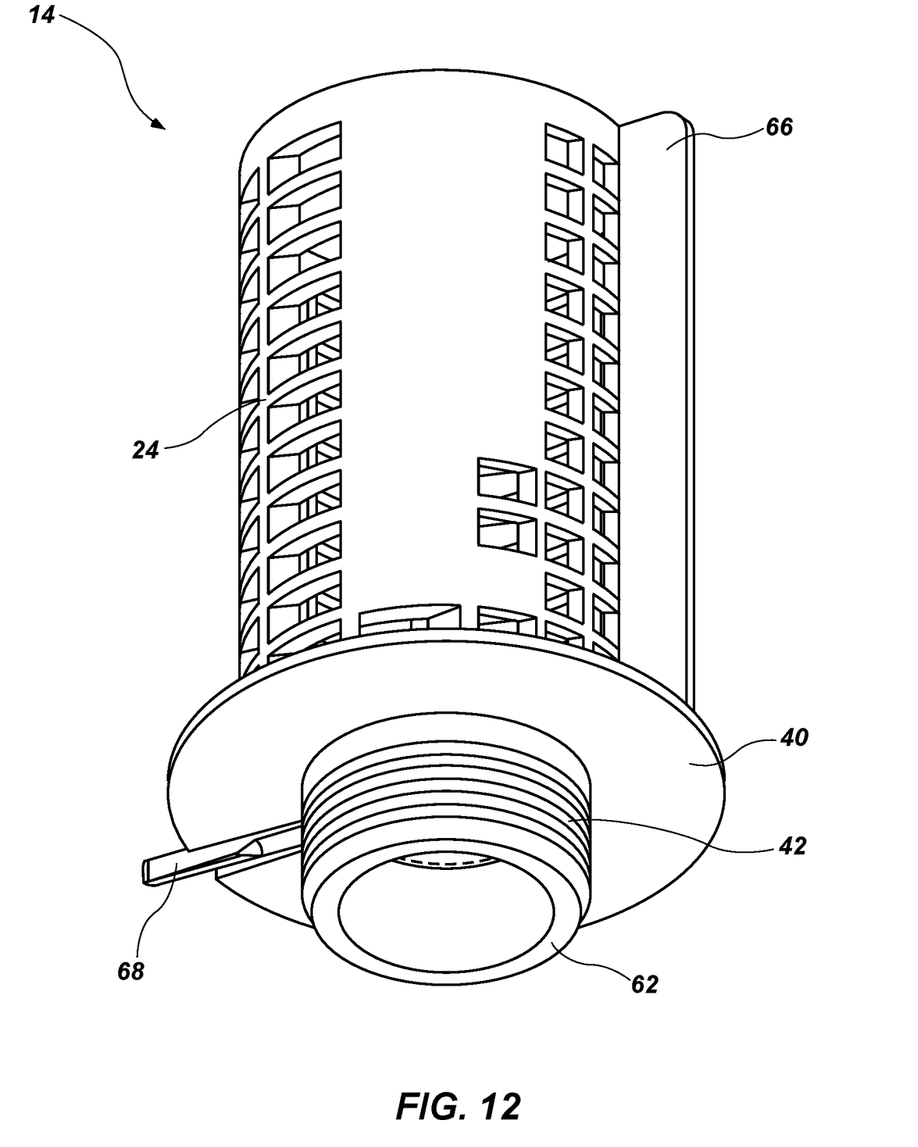
FIG. 12 is a bottom perspective view of the core of FIG. 8.

The fitting 26 may comprise a hole 54 passing centrally through the fitting 26 allowing the passage of water into the suction line of the spa. The fitting 26 may include a cage facing end 56 which engages the first cage 24 and a spa facing end 58 which engages the spa. Interior threads 60 may extend, at least partially, from the cage facing end 56 within the hole 54 of the fitting 26. Complementary threads may be positioned on an outside of a fitting facing end 62 of the first cage 24 (refer to FIG. 12). The core 14 may be rotatably advanced onto the fitting 26. The fitting 26 may further include a series of fins 64, or ribs or barbs, toward the cage facing end 56. The fins 64 may prevent removal of the fitting 26 from the core 14. The fins 64 may have a sloped or ramped design that when engaged with the core 14 the core 14 may only be advanced in a single direction. The fins 64 are of a sloped orientation (from a top orientation) wherein the fins 64 may extend tangential to the outer perimeter of the fitting 26 and may curve or bend toward the hole 54 of the fitting 26 in such a way to allow advancement of the core 14 onto the fitting 26 in a one-way direction. Alternatively, the fins 64 may be straight and extend from the outer perimeter of the fitting 26 to the hole 54. Further still, the fins 64 may resemble a simple ratchet system with peaks and valleys that may engage a locking arm of the core 14.

The fitting 26 may be comprised of a polymer or polymer-like material and may be PVC or other polyurethane or other hard plastic that maintains its shape and is not easily deformed. The fitting 26 may be substantially rigid to be fitted to the spa, or suction line, and strong enough to receive the core 14 and essentially the remainder of the filter system 10. It will be appreciated that any number of materials are contemplated including all plastics and polymers as well as metals and carbon-fiber alternatives.

Referring to FIGS. 11-15, the first cage 24 may comprise a longitudinal tube. A rib 66 may extend away from a center line of the first cage 24. The rib 66 may extend longitudinally along the length of the tube terminating at the shoulder 40. The rib 66 may provide a rigid orientation feature for the filter 12 (refer to FIG. 7) as described previously herein, wherein the rib 66 may slidably engage the cutout 38 and the filter 12 such that the filter 12 is non-rotatable when engaged to the core 14.

The first cage 24 also includes an arm 68, which may be a locking arm. The arm 68 may ratchet into place allowing the fins 64 of the fitting 26 to push the arm 68 up and out of the way as the first cage 24 is advanced onto the fitting 26 in a single direction. The arm 68 may have a ramp or sloped design that allows it to be displaced as the first cage 24 is advanced onto the fitting 26. The arm 68 prevents the reversal of the first cage 24 off of the fitting 26, and specifically any inadvertent back out, or removal by creating a hard stop, by the arms 68 engaging or pressing against the fins 64.

Figure 15:
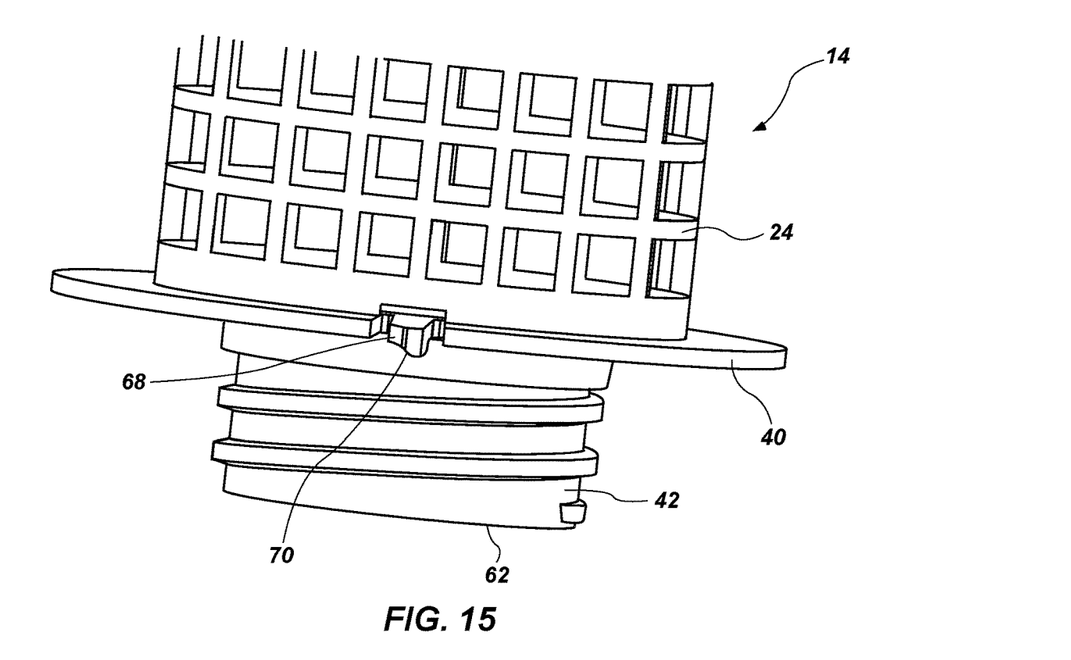
FIG. 15 is a blown-up perspective view of a proximal portion of the core of FIG. 8 with an arm extending from the core.

The arm 68 may be flexible such that the arm 68 may be manually or physically manipulated, or actuated, out of a resting position to remove the hard stop against the fins 64 and allow a user to remove the first cage 24 from the fitting 26, but only so long as the arm 68 is lifted out of the way of the fins 64. The arm 68 may be pressedly pushed in an upward direction, or toward the cap 16 of the filter system 10, to remove the stop of the arm 68 against the fins 64. Alternatively, the arm 68 may bias a number of different directions to remove the stop. After the arm 68 is physically manipulated it may automatically return to its original position.

The arm 68 and the fins 64 may provide a safety feature not currently found in current designs. While the core 14 is in place that a user may have little risk to life or injury when replacing the filter 12 even if the spa pump is on. The purpose is for the core 14 to remain in place while the filter 12 is removed and cleaned and then replaced or a new filter 12 is placed over the core 14. Water may flow freely through the core 14 while preventing objects from entering the first cage 24 and thus the suction line and pump which may cause harm to the pump. Additionally the first cage 24 prevents the suction line from being clogged or the pump from burning out because it will be difficult to cover enough of the openings of the cage or lattice design to prevent all the water from passing through.

The core 14 including the first cage 24 and the second cage 28 may be comprised of a rigid plastic such as PVC or other polymer. The core 14 may be required to be substantially rigid and will require a firm plastic, metal or carbon-fiber to maintain its position and shape while withstanding the forces of the suction pump of the spa.

Figure 13:
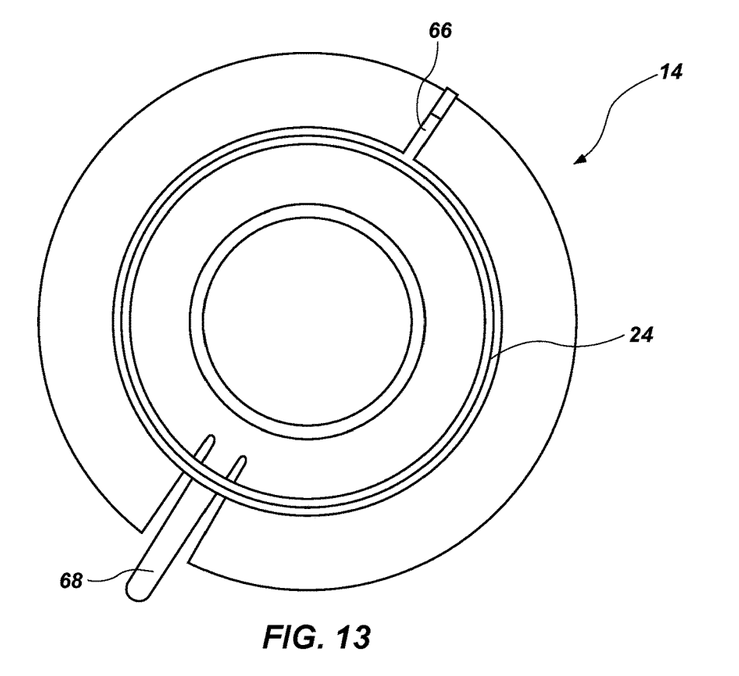
FIG. 13 is a top view of the cage of FIG. 8.
Figure 14:
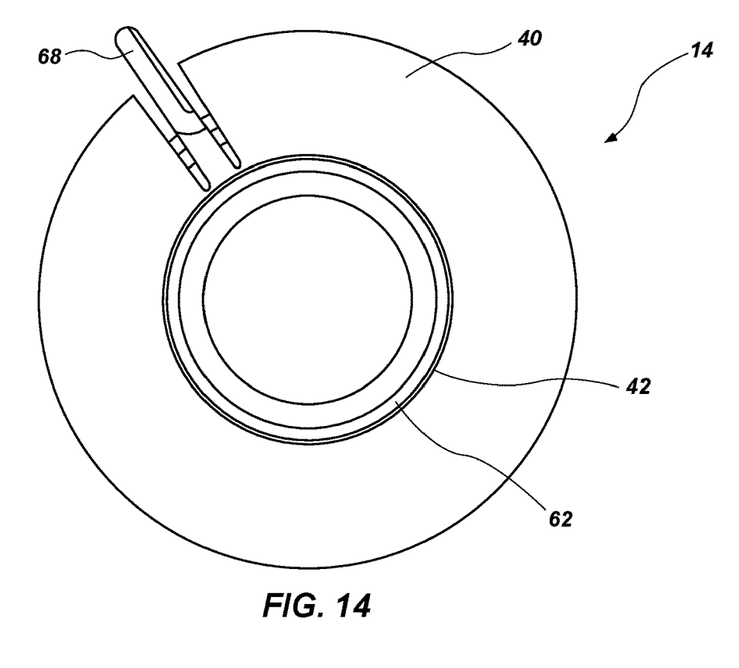
FIG. 14 is a bottom view of the cage of FIG. 8.

Referring to FIGS. 13-15, the arm 68 may extend outward from a center of the core 14. The arm 68 may cut into the shoulder 40 such that the arm 68 may be flexible allowing it to be easily moved when advancing the core 14 onto the fitting 26. The ramp 70 of the arm 68 may extend from the downward facing portion of the arm 68 such that it may engage the fins 64.

The arm 68 with the core 14 may be manufactured in a single piece, or injection mold, the same material as the remainder of the core 14 only thinner to allow it to be manipulated; however, the arm 68 may be an alternative material that is welded or attached to the core 14 in the same or similar manner as though it was one composite piece.

Figure 16:
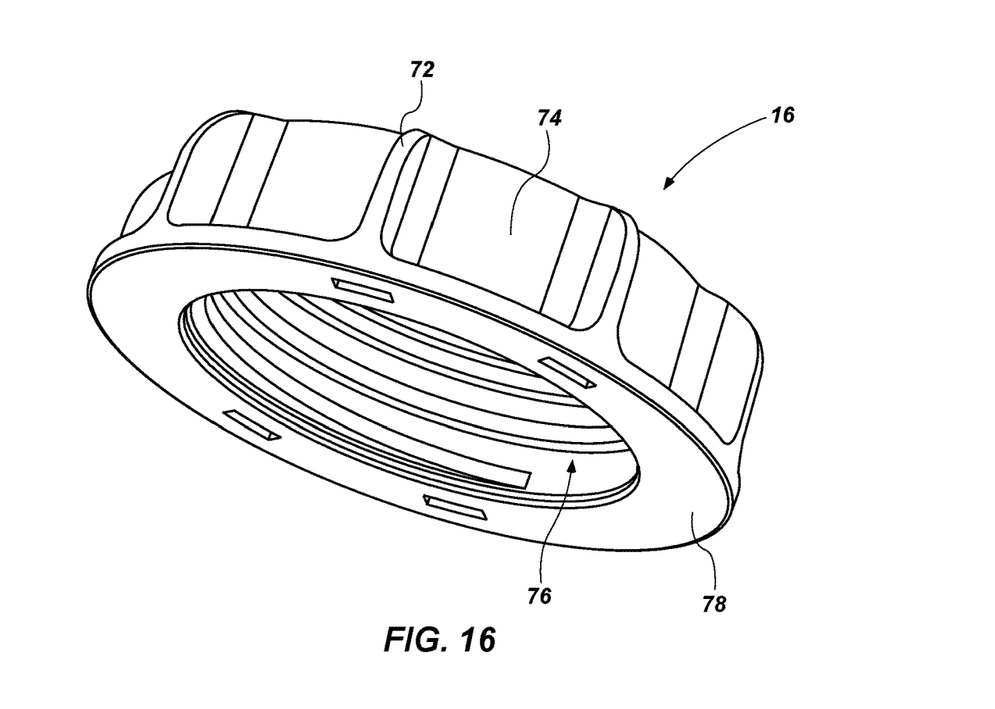
FIG. 16 is a perspective view of the cap of FIG. 8.

Referring to FIG. 16, the filter system cap 16 includes ridges 72 that may provide ease in attaching or removing the filter system cap 16 to the filter system 10. The ridges 72 may include complementary grooves 74 that may receive a user's fingers or digits. The filter system cap 16 may include a cavity 76 passing at least partially through the body of the filter system cap 16. The cavity 76 may include threads that may complementary thread with the distal end 22 of the core 14. A core facing portion 78 of the filter system cap 16 may be larger in diameter than the body of the filter system cap 16 thus providing a larger footprint to engage the filter 12 preventing the filter 12 from undesired vertical motion. The core facing portion 78 may sit against the filter 12 when the cap 16 is in place on the core 14.

While the current filter system cap 16 design may include specifics with regard to ridges, grooves and larger diameters, it will be appreciated that a number of similar caps are contemplated with and without ridges and grooves, with more grooves or less grooves. Alternate cross-sectional shapes are contemplated beyond a cylinder and any cross-sectional polygonal shape may be utilized. Additionally, wings which may protrude from the core facing portion 78 to secure the filter 12 to the core 14 are also contemplated. Furthermore, depth of the cavity 76 and displacement of the threads is variable so long as the cap 16 is sufficiently attached and secured to the core 14. The cap 16 may not require threads and may be a locking fit, snap fit, press fit or other means to maintain the cap 16 on the core 14.

The cap 16 may be comprised of a polymer or polymer-like material and may be PVC or other polyurethane or other hard plastic that maintains its shape and is not easily deformed, similar to the fitting 26. The cap 16 may be substantially rigid to secure the entire filter system 10 into place within or on the spa. It will be appreciated that any number of materials are contemplated including all plastics and polymers as well as metals and carbon-fiber alternatives.

One method of assembly for the filter system 10 may include positioning the fitting 26 into the spa or the suction line of the spa. Advancing the core 14 into or onto the fitting 26 to the proper filter orientation. Placing or positioning the second cage 28 onto or into the first cage 24 if the second cage 28 is a separate element. Placing the filter 12 onto the core 14 in the orientation allowed by the cutout 38 and the orientation rib 66. Advancing the cap 16 onto the core 14 and securing the entire filter system 10 into place.

Although the foregoing disclosure provides many specifics, such as use of the system in spas, it will be appreciated that pools, bathtubs, and other filterable water holding devices are contemplated and these should not be construed as limiting the scope of any of the ensuing claims. Other embodiments may be devised which do not depart from the scopes of the claims. Features from different embodiments may be employed separately or in combination. Accordingly, all additions, deletions and modifications to the disclosed subject matter that fall within the scopes of the claims are to be embraced thereby. The scope of each claim is indicated and limited only by its plain language and the full scope of available legal equivalents to its elements.

What is claimed:

1. A filter system comprising:
a core comprising:
a proximal portion and a distal portion with a first cage having a tubular body with a plurality of openings positioned between the proximal portion and the distal portion;
a second cage having a tubular body with a plurality of openings separate from the first cage, the second cage positioned toward the distal portion within the first cage, wherein the second cage is configured to receive a cartridge;
a fitting positioned toward the proximal portion of the core, the fitting comprises a hole passing through a center thereof and a plurality of fins positioned at a cage facing end of the fitting and configured to engage an arm of the core positioned toward the proximal portion wherein the fins allow one-way advancement of the core onto the fitting;
a cap positioned toward the distal portion of the core;
a filter with a channel passing therethrough; and
a shoulder positioned toward the proximal portion, the shoulder extending circumferentially from the core.

2. The filter system of claim 1, wherein the first cage further comprises a rib extending from the core and at least partially extending the length of the first cage.

3. The filter system of claim 2, the core further comprising an arm extending from the shoulder, the arm configured to engage the fitting such that the core may be advanced onto the fitting in a one-way direction.

4. The filter system of claim 3, wherein the arm is sloped and deformable.

5. The filter system of claim 2 wherein the filter comprises:
   a top plate and a bottom plate wherein each of the top plate and the bottom plate comprise a cutout at least partially extending from the channel toward an outer perimeter of the filter.

6. The filter system of claim 1, wherein the filter further comprises a structural member within the channel to maintain rigidity of the filter.

7. The filter system of claim 1, wherein the filter is configured to fit around the core, wherein a cutout of the filter is configured to receive a rib of the core orienting the filter in a first position.

8. The filter system of claim 1, wherein the filter comprises filter media wherein the filter media is denser toward one side of the filter and less dense toward an opposite side of the filter.

\* \* \* \* \*